(12) United States Patent
Kasapi et al.

(10) Patent No.: US 7,593,693 B1
(45) Date of Patent: Sep. 22, 2009

(54) ADAPTIVE ANTENNA ARRAY WITH PROGRAMMABLE SENSITIVITY

(75) Inventors: Athanasios A. Kasapi, San Francisco, CA (US); Mitchell D. Trott, San Mateo, CA (US); Peter G. Khoury, San Francisco, CA (US); Adam B. Kerr, Redwood City, CA (US); Serge Barbosa Da Torre, Paris (FR)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 11/375,500

(22) Filed: Mar. 13, 2006

Related U.S. Application Data

(63) Continuation of application No. 09/967,896, filed on Sep. 28, 2001, now Pat. No. 7,039,363.

(51) Int. Cl.
*H04B 17/00* (2006.01)
*H04B 1/00* (2006.01)
*H04B 15/00* (2006.01)

(52) U.S. Cl. ............... 455/67.13; 455/67.11; 455/63.1; 375/144; 375/285

(58) Field of Classification Search ............. 455/67.11, 455/67.13, 67.14, 63.1, 114.2; 375/285, 375/144
See application file for complete search history.

(56) References Cited

U.S. PATENT DOCUMENTS

| | | | |
|---|---|---|---|
| 5,982,327 A * | 11/1999 | Vook et al. .................. 342/380 |
| 6,141,567 A | 10/2000 | Youssefmir et al. | |
| 6,144,651 A | 11/2000 | Rinchiuso et al. | |
| 6,181,955 B1 * | 1/2001 | Dartois ..................... 455/562.1 |
| 6,243,412 B1 * | 6/2001 | Fukawa ...................... 375/219 |
| 6,272,124 B1 | 8/2001 | Ahn et al. | |
| 6,452,981 B1 | 9/2002 | Raleigh et al. | |
| 6,714,585 B1 | 3/2004 | Wang et al. | |
| 7,433,384 B2 * | 10/2008 | Smee et al. .................. 375/142 |
| 2002/0013164 A1 | 1/2002 | Leifer et al. | |
| 2002/0042290 A1 * | 4/2002 | Williams et al. ............ 455/562 |

* cited by examiner

*Primary Examiner*—George Eng
*Assistant Examiner*—Un C Cho
(74) *Attorney, Agent, or Firm*—Blakely, Sokoloff, Taylor & Zafman LLP

(57) ABSTRACT

Methods and apparatus for calculating spatial processing strategies in adaptive antenna array processing systems. Reference signal quality, intersymbol interference, data processed and received signal quality can be determined by burst type or remote device type and used to determine a synthetic signal level for use in developing a spatial processing strategy. A synthetic signal have an isotropically distributed component can be added to the antennas in the array or the diagonal elements of the received signal covariance matrix to develop uplink and downlink spatial processing strategies. Different synthetic signals at different signal levels can be used to develop different uplink and downlink spatial processing strategies. The downlink signal level can be larger than the uplink signal level. Uplink and downlink processing strategies can be developed in substantially the same way.

22 Claims, 4 Drawing Sheets

ADAPTIVE ANTENNA ARRAY WITH PROGRAMMABLE SENSITIVITY

RELATED APPLICATION

This application is a Continuation of, and claims the benefit of, application Ser. No. 09/967,896 filed Sep. 28, 2001, now issued U.S. Pat. No. 7,039,363.

TECHNICAL FIELD

The invention relates to wireless communications systems.

BACKGROUND

Antenna arrays may be used in any wireless communication receiver, transmitter or transceiver that transmits or receives radio frequency signals using an antenna. The use of antenna arrays provides for performance improvements over conventional devices that communicate using a single antenna element. These improvements include but are not limited to improvements in the signal-to-noise ratio (SNR) and the signal-to-interference-plus-noise ratio (SINR) of received and transmitted signals, and improvements in the directionality with which signals can be received from or transmitted to a selected device.

An example of a wireless communication system that includes an antenna array is a cellular communication system consisting of one or more base stations, each communicating with its subscriber units, also called remote terminals or handsets. In cellular systems, the remote terminal may be mobile or in a fixed location. Antenna arrays can be used at the base station transceiver, at the handset transceiver, or at both locations to improve the communication link between the devices. Antenna arrays can be used in a wireless communication system to add Spatial Division Multiple Access (SDMA) capability to the system. SDMA refers to the ability to spatially multiplex a conventional communication channel such as a frequency band in a Frequency Division Multiple Access (FDMA) system, a time slot in a Time Division Multiple Access (TDMA) system, or a pseudo-random code in a Code Division Multiple Access (CDMA) system.

Adaptive smart antenna processing may be used in a transceiver equipped with multiple antennas, and involves developing a beam-forming strategy to either reject interference when receiving a signal from a selected transceiver (an uplink strategy), or to deliver power in a spatially or spatio-temporally selective manner when transmitting a signal to a selected transceiver (a downlink strategy). In a linear system, developing an uplink strategy involves finding a series of complex weights in a receive weight vector such that the inner product of the receive weight vector and the signals received at each of the antenna array elements preferentially selects or enhances the signals transmitted by a selected transceiver while preferentially rejecting or minimizing spurious signals transmitted by one or more noise or interference sources.

The contents of the receive weight vector for a selected transceiver can be determined from knowledge about the signals transmitted by that transceiver such as the data content of the signals, or the way in which data is modulated onto the signals. For example, a transmitted signal can be reconstructed from a plurality of signals received by an antenna array by adjusting the weights in a variable receive weight vector so that the reconstructed transmitted signal has a constant modulus. This method of determining the receive weight vector is useful in communication systems that use a modulation scheme in which information is encoded onto a constant modulus carrier signal. Examples include phase modulation (PM), frequency modulation (FM), phase shift keying (PSK) and frequency shift keying (FSK). Other methods of determining the receive weight vector are also possible. For example, a transmitted signal can be reconstructed from a plurality of signals received by an antenna array by adjusting the weights in a variable receive weight vector so that the data content of the reconstructed transmitted signal agrees with locally generated training data. Training data are data symbols that are known to have been sent by a selected transceiver at a known time in a signal burst from the selected transceiver.

Similar to developing an uplink strategy, developing a downlink strategy in a linear system involves finding a series of transmit weights in a transmit weight vector such that when a signal to be transmitted by an antenna in the antenna array is weighted by its corresponding transmit weight from the transmit weight vector, the net signal transmitted by all of the antennas in the antenna array is preferentially directed toward a selected transceiver while being preferentially directed away from one or more sources of noise or interference. In some systems, for example in time-division duplex ("TDD") systems, the transmit weight vector may be determined in part from the receive weight vector.

The development of beam-forming strategies in an adaptive smart antenna processing systems can be based on a number of competing factors. Such factors include but not are limited to the quality of signals received from or transmitted to a selected transceiver, the absolute power delivered to a selected transceiver, the relative importance between a selected transceiver and one or more interfering transceivers, the relative need for mitigation or nulling of the signals received from or transmitted to an interfering transceiver, the input signal-to-noise (SNR) ratio, the carrier-to-interference ratio (CIR), the bit error rate (BER) and the spatial correlation between a selected transceiver and an interfering transceiver. Since it is impossible to develop a beam-forming strategy that simultaneously optimizes each of these competing factors, there is a need for smart adaptive antenna processing systems that can adaptively develop different beam-forming strategies to operate efficiently in different situations.

SUMMARY

The invention discloses methods and apparatus for calculating a spatial processing strategy in an adaptive antenna array processing system.

In one aspect, the invention discloses an adaptive antenna array processing system that determines a quality of a reference signal used by the system, uses the quality of the reference signal to determine a signal level for a variable synthetic signal, and uses the variable synthetic signal at the signal level to develop a spatial processing strategy. The signal level for the variable synthetic signal can be increased as the quality of the reference signal decreases.

Advantages of the invention include one or more of the following. The system can add the variable synthetic signal at the signal level to the diagonal elements of a covariance matrix made from a signal received from a device communicating with the adaptive antenna processing system to develop a spatial processing strategy. The system can add the variable synthetic signal at the signal level to each of the antennas in the adaptive antenna array processing system to develop a spatial processing strategy. The variable synthetic signal can have an isotropically distributed component. Different signal levels of the variable synthetic signal can be used to develop different uplink and downlink spatial processing strategies.

In another aspect, the invention discloses an adaptive antenna array processing system that determines an amount of intersymbol interference in signals processed by the system, uses the amount of intersymbol interference to determine a signal level for a variable synthetic signal, and uses the variable synthetic signal at the signal level to develop a spatial processing strategy. The signal level for the variable synthetic signal can be increased as the amount of intersymbol interference increases.

In another aspect, the invention discloses an adaptive antenna array processing system that determines an amount of data used by the system to develop a spatial processing strategy, uses the amount of training data to determine a signal level for a variable synthetic signal; and uses the variable synthetic signal at the signal level to develop a spatial processing strategy. The signal level for the variable synthetic signal can be increased as the amount of training data decreases.

Advantages of the invention include one or more of the following. The amount of data used to develop a beamforming strategy can be determined by determining a burst type of a communication from a device communicating with the adaptive antenna array processing system. The amount of data used to determine a beamforming strategy can also be determined by determining a device type of a device communicating with the adaptive antenna array processing system.

In another aspect, the invention discloses an adaptive antenna array processing system that determines a first signal level for a first variable synthetic signal; uses the first variable synthetic signal at the first signal level to develop an uplink spatial processing strategy; determines a second signal level for a second variable synthetic signal; and uses the second variable synthetic signal at the second signal level to develop a downlink spatial processing strategy.

Advantages of the invention can include one or more of the following. The first variable synthetic signal and the second variable synthetic signal can have the same signal waveform. The uplink and downlink spatial processing strategies can be developed in substantially the same way. The second signal level used to develop the downlink processing strategy can be larger than the first signal level used to develop the uplink processing strategy. The first and second signal levels can be determined by determining a quality of a signal received from a device communicating with the adaptive antenna array processing system.

In another aspect, the invention discloses an adaptive antenna array processing system that determines a quality of a signal received from a device communicating with the adaptive antenna array processing system; uses the quality to determine a signal level for a variable synthetic signal; and uses the synthetic signal at the signal level to develop a spatial processing strategy.

Advantages of the invention can include one or more of the following. The quality of the signal received from the device can be determined from the strength of the signal received from the device. The quality of the signal received from the device can also be determined from the pathloss between the device and the adaptive antenna processing. The spatial processing strategy can be developed by adding the variable synthetic signal at the signal level to the diagonal elements of a covariance matrix made from the signals received from the device communicating with the adaptive antenna processing system. The spatial processing strategy can also be developed by adding the variable synthetic signal at the signal level to each of the antennas in the adaptive antenna array processing system. The variable synthetic signal can have an isotropically distributed component. Different signal levels of the variable synthetic signal can be used to develop different uplink and downlink spatial processing strategies.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention can be implemented in any communications station having either a transmitter, a receiver, or both a transmitter and receiver ("transceiver"), that is connected to an antenna array 103 containing a plurality of M antenna elements, and having means for adaptive smart antenna processing of the signals received from or transmitted by the M antenna elements.

Figure 1:
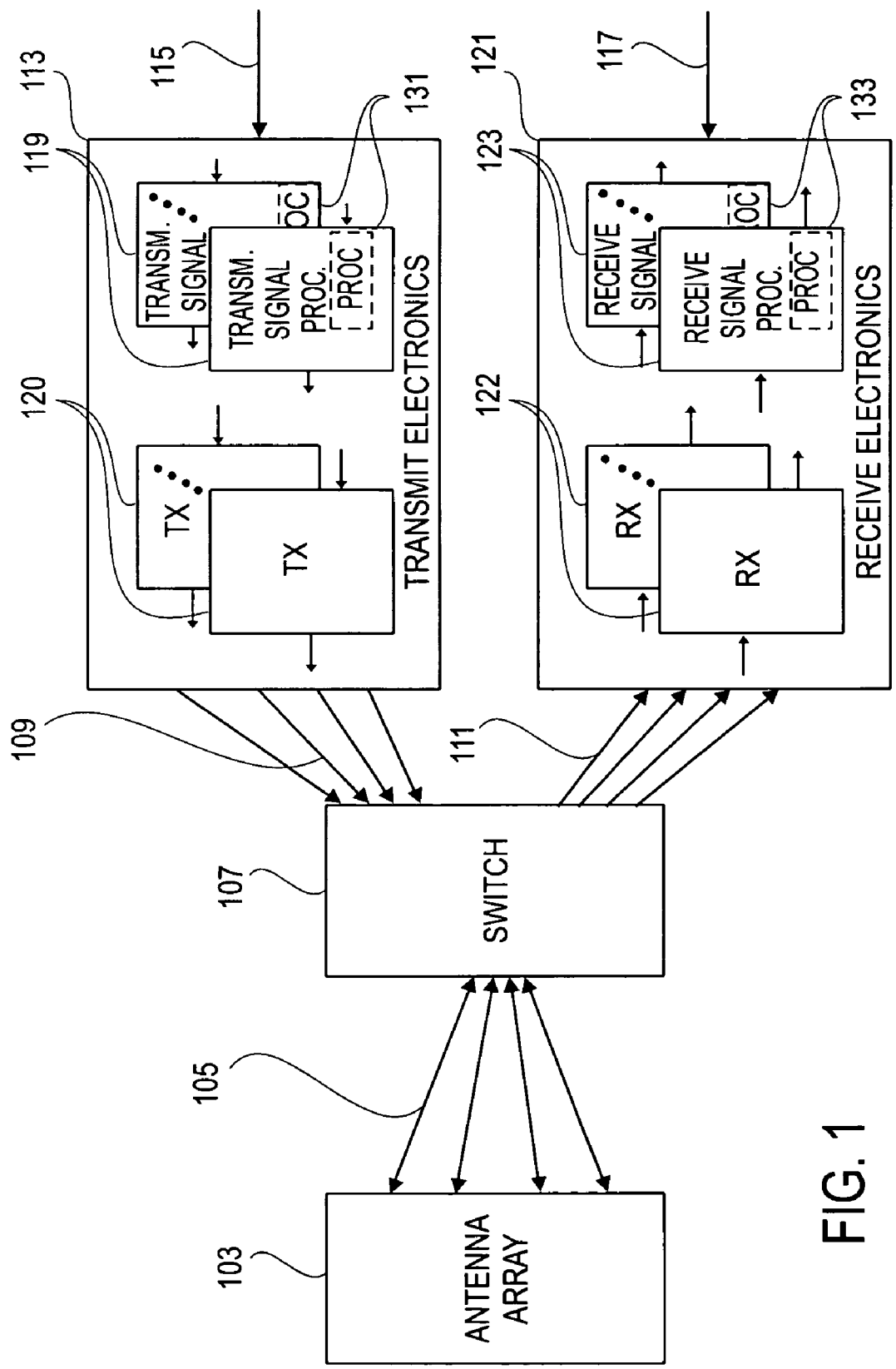
FIG. 1 is a schematic illustration of a communication system that can develop different uplink and downlink beamforming strategies using a variable sensitivity antenna array.

In one implementation, shown in FIG. 1, the communications station includes a switch 107 that is connected between antenna array 103 and both transmit electronics 113 and receive electronics 121. Transmit electronics 113 includes one or more transmit signal processors 119 and transmitters 120 corresponding to the M antennas in antenna array 103. Similarly, receive electronics 121 includes one or more receive signal processors 123 and receivers 122 corresponding to the M antennas in antenna array 103. Transmitters 120 and receivers 122 can be implemented with analog electronics, digital electronics, or a combination of the two. In one implementation, receivers 122 are configured to receive and digitize analog signals from the M antennas in antenna array 103, and to send the digitized signals to M receive signal processors 123. Transmit and receive signal processors 119 and 123 can be implemented as hardware, software, or any combination of the two. In one implementation, transmit and receive signal processors 119 and 123 are implemented using one or more conventional digital signal processors ("DSP's") separately programmed for signal reception and transmission.

Switch 107 can selectively connect one or more elements of antenna array 103 to the transmit electronics 113 when in the transmit mode, and to receive electronics 121 when in the receive mode. Switch 107 can be implemented as a frequency duplexer in a frequency division duplex ("FDD") system in which communications received from and transmitted to a selected transceiver are respectively received and transmitted on different frequency channels. Alternatively, switch 107 can be implemented as a time switch in a time division duplex (TDD) system in which communications received from and transmitted to a selected transceiver are respectively received and transmitted on the same frequency channel but at different time slots.

Figure 2:
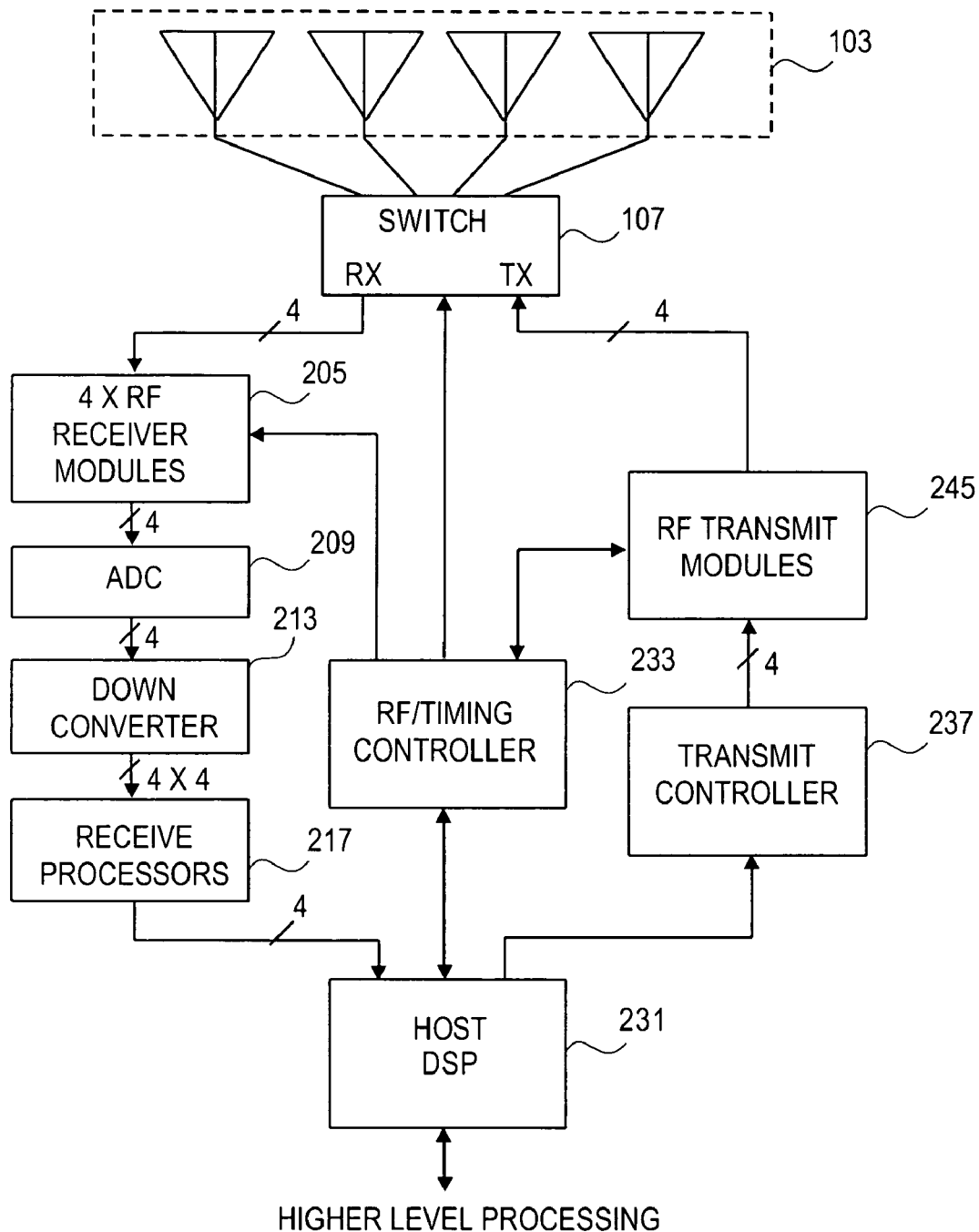
FIG. 2 is a more detailed schematic illustration of the communication system of FIG. 1.

FIG. 2 is a more detailed block diagram of the communication system of FIG. 1. As shown in FIG. 2, a plurality of M antennas in an antenna array 103 are connected to switch 107. When in receive mode, signals received by the antennas in antenna array 103 are connected via switch 107 to a plurality of corresponding RF receiver modules 205. RF receiver modules 205 are configured to downconvert the received signals from their carrier frequency to an intermediate frequency ("IF"). The downconverted signals are then digitized (sampled) by a plurality of analog to digital converters ("ADCs") 209, and downconverted to baseband by digital downconverters 213. In one implementation, elements 205, 209 and 213 are implemented in the receiver module 122 of FIG. 1.

The baseband signals produced by digital downconverters 213 are sent to a plurality of conventional digital signal processors (DSP's) configured as receive processors 217. Receive processors 217 can be configured to perform one or more of several functions, including but not limited to: determining the inphase (I) and quadrature phase (Q) components of the received signal; monitoring the power level of the received signal; estimating and correcting any frequency or timing offset in the received signal; developing an uplink strategy to selectively receive a signal from a selected transceiver; and demodulating the signal received from the selected transceiver.

The output from receive processors 217 is sent to host processor 231 which can be implemented as a conventional DSP. Host processor 231 is configured to receive and respond to control signals from a selected transceiver and to generate and transmit control signals to be delivered to the selected transceiver according to a communications protocol that has been established between the communications station and the selected transceiver. Host processor 231 can be configured to receive a receive weight vector, a transmit weight vector, or both from receive processors 217, or can be configured to receive sampled downconverted signals from receive processors 217 and to determine the receive weight vector, transmit weight vector, or both from the sampled received signals. Host processor 231 is configured to control all of the elements of the communication system, including RF timing controller 233 and transmit controller 237.

RF timing controller 233 is configured to produce a number of timing signals that are used by RF transmit modules 245 and RF receiver modules 205. Transmit controller 237 is configured to receive data to be transmitted to a selected transceiver from host DSP 231, together with a transmit weight vector to selectively transmit the data to the selected transceiver. Transmit controller 237 can alternatively be configured to receive sampled downconverted signals from receive processors 217 or host DSP 231, and to determine the transmit weight vector from the sampled received signals. Thus, the transmit weights utilized by transmit controller 237 can be determined in the controller itself, in host DSP 231, or in receive processors 217. Transmit controller 237 is also configured to perform one or more of the following: modulate the data to be transmitted according to a data modulation scheme; up-convert the modulated data to an intermediate frequency (IF); produce a plurality of signals to be respectively transmitted by each antenna in antenna array 103 by multiplying the up-converted modulated data by a respective plurality of transmit weights in a transmit weight vector; and convert the plurality of signals to be transmitted from a digital to an analog form using a respective plurality of digital to analog converters ("DACs"). The modulated analog waveforms produced in transmit controller 237 are upconverted to a transmission frequency, amplified by a plurality of RF transmit modules 245, and sent via switch 107 to respective antennas in antenna array 103.

In conventional smart adaptive antenna processing systems, uplink communication strategies can be developed in receive weight processor 217 by assuming that a signal s(t) transmitted by a selected transceiver can be reconstructed from a linearly weighted combination of the plurality of signals $z_i(t)$ received by the respective plurality of antennas in antenna array 103. The receive weights corresponding to the selected transceiver can be obtained by reconstructing the transmitted signal s(t) from the received signals $z_i(t)$ such that:

$$s(t) = \vec{w}_r^H \cdot \vec{z}(t) = \sum_{i=1}^{M} w_{r,i}^* \cdot z_i(t) \tag{1}$$

where $z(t)=\{z_1(t), z_2(t), \ldots, z_M(t)\}^T$ is a vector consisting of the signals received in each of the M antennas in antenna array 103, and $W_r^H=\{w^*_{r1}, w^*_{r2}, \ldots, w^*_{rM}\}$ is the Hermitian transpose of a receive weight vector corresponding to the selected transceiver. Since the received signals $z_i(t)$ are discretely sampled N+1 times over some sampling period T, Eq. (1) can be rewritten to express the relationship between each sample s(nT/N) of the transmitted signal and each sample of the received signal vector z(nT/N), such that:

$$\vec{s} = \vec{w}_r^H \cdot \vec{\bar{z}}; \tag{2}$$

where the signal vector $\vec{s} = \{s(0), s(T/N), s(2T/N), \ldots, s(T)\}$ contains the transmitted signal sampled at times (0, T/N, 2T/N ... T); and the received signal matrix $\bar{z}$ contains the signals received on each antenna 1, 2 ... M of antenna array 103 at sample times (0, T/N, 2TN ... T). The received signal matrix $\bar{z}$ can be written as:

$$\{\vec{\bar{z}}\} = \begin{pmatrix} z_1(0) & z_1(T/N) & \ldots & z_M(T) \\ z_2(0) & z_2(T/N) & \ldots & z_2(T) \\ \vdots & \vdots & \vdots & \vdots \\ z_M(0) & z_M(T/N) & \ldots & z_M(T) \end{pmatrix} \tag{3}$$

Each column of the received signal matrix $\bar{z}$ contains a sample of the signals received at each of the antennas in antenna array 103 at a time (nT/N) corresponding to signal sample n. Similarly, each row of the received signal matrix $\bar{z}$ contains the signal received at a corresponding antenna of antenna array 103 sampled at times (0, T/N, 2T/N ... T).

The receive weight vector $w_r^H$ appearing in Eq. (2) can be solved for using well known techniques of linear algebra. Thus, by taking the Hermitian conjugate of Eq. (2), one obtains:

$$\vec{s}^H = \bar{z}^H \cdot \vec{w}_r. \tag{4}$$

Multiplying both sides of Eq. (4) with the matrix $\bar{z}$, one obtains:

$$\bar{z} \cdot \vec{s}^H = (\bar{z} \cdot \bar{z}^H) \cdot \vec{w}_r. \tag{5}$$

Inverting the so-called co-variance matrix $(\vec{z} \cdot \vec{z}^H)$ appearing on the right hand of Eq. (5), and multiplying both sides of Eq. (5) with the inverted covariance matrix $(\vec{z} \cdot \vec{z}^H)^{-1}$, one obtains the receive weight vector:

$$\vec{w}_r = (\vec{z} \cdot \vec{z}^H)^{-1} \cdot (\vec{z} \cdot \vec{s}^H). \quad (6)$$

As seen in Eq. (6), determination of the receive weight vector that will allow the smart antenna processing system to preferentially receive transmissions from a selected transceiver requires knowledge about the signal s(t) transmitted by that transceiver. In general, the signal transmitted by the selected transceiver is not known, however in many systems the selected transceiver will transmit a known signal or a signal having known properties at known times in a communications burst. In such systems, the receive weight vector can be determined from Eq. (6) by substituting a reference signal $s_r(t)$ for the signal s(t) that is transmitted by the selected transceiver. The reference signal is a locally generated signal having one or more properties in common with the transmitted signal. For example, when the transmitted signal is known to contain training data, the reference signal is a locally generated signal that contains the same training data. Similarly, when the transmitted signal has a known constant property such as a constant modulus, the reference signal is a locally generated signal having the same constant property.

In general, when the receive weight vector is calculated according to Eq. (6), the inner product of the receive weight vector with the sampled received signal ("weighted received signal") does not identically match the reference signal. Instead, the weighted received signal matches the sum of the reference signal plus an error signal. While iterative application of Eq. (6) can improve the agreement between the weighted received signal and the reference signal, in general a small error signal will remain. The size of the error signal results from a number of factors including but not limited to: errors in the locally generated reference signal such as phase alignment errors; noise in the received signals; interference in the received signals from one or more interfering transceivers; and errors in the signal transmitted by the selected transceiver such as signal distortion.

As previously mentioned, development of a downlink processing strategy to selectively transmit data to a selected transceiver can be performed in receive processors 217, host DSP 231, or transmit controller 237. In time-division duplex systems, the downlink processing strategy can be developed in receive processors 217 by forming a downlink or transmit weight vector from the uplink or receive weight vector determined in Eq. (6) and calibration data that corrects for any differences in the uplink and downlink electronic chains. Once the downlink weights are determined, downlink processing includes forming a set of antenna signals $z(t) = \{z_1(t), z_2(t), \ldots, z_M(t)\}^T$ from a signal s(t) to be transmitted by weighting the signal s(t) by the respective plurality of weights in the transmit weight vector $w_t^H = \{w^*_{t1}, w^*_{t2}, \ldots, w^*_{tM}\}$.

In normal operation of the communication station of FIG. 2, antenna array 103 receives data from a selected transceiver in communication bursts or frames from the selected transceiver. During such bursts, receive processor 217 has a limited amount of time to determine, monitor, and refine a receive weight vector for the selected transceiver. Due to this time constraint and limitations in the computing power of receive processor 217, the received signal covariance matrix $(\vec{z} \cdot \vec{z}^H)$ that is accumulated to determine the receive weight vector is typically made from a limited number of samples of the received signal. Typically, these samples are taken at the baud points of the locally generated reference signal. A number of problems can occur because of the limited number of samples taken of the received signal. One such problem is overtraining of the receive weight vector. An overtrained received weight vector performs well when recovering data from the received signal from which the receive weight vector was determined, but can perform poorly when recovering data from later transmitted signals that were not used to calculate the receive weight vector.

One explanation for overtraining is that the spatial spectra of the noise that is received by the antennas in antenna array 103 together with the received signals cannot be accurately sampled with a limited number of received signal samples. If the noise could be accurately sampled, the resulting spatial spectrum would be flatly or randomly distributed. However, when only a limited number of samples of the noise spectrum are taken together with the received signal samples, the resulting spatial spectrum will generally contain apparently localized, non-random sources of noise. When the smart adaptive processing system develops a beam-forming strategy from this data, it will attempt to neutralize or mitigate these apparently localized sources of noise. While this will improve the system's ability to recover the very data that is used to develop the beam-forming strategy (i.e. the receive weights) it will decrease the system's ability to recover any other data since the noise sampled with that data will likely contain sources of noise that appear to originate from entirely different locations.

Fortunately, it is possible to decrease the sensitivity of the smart adaptive antenna processing system to noise and randomly distributed interferers by adding isotropically distributed noise or synthetic signals to the received signal. Adding isotropically distributed noise or synthetic signals to the received signal alleviates the problems associated with limited sampling, and can be accomplished in any of a number of different ways. These include, but are not limited to, adding noise to the signals received by each of the antennas of antenna array 103, adding a synthetic signal to the signals received by each of the antennas of antenna array 103, diagonally loading or regularizing the covariance matrix formed from the sampled received signals, and finding and directly manipulating the magnitude of the eigenvalues of the covariance matrix. The covariance matrix formed from the sampled received signals can be diagonally loaded by adding a regularization constant to each of its diagonal elements. While different regularization constants can be added to each of the diagonal elements of the covariance matrix, it is nonetheless customary to add a single regularization constant β (beta) such that:

$$(\vec{z} \cdot \vec{z}^H)^{-1} \Rightarrow (\vec{z} \cdot \vec{z}^H + \beta \cdot I)^{-1}. \quad (7)$$

Adding beta to the diagonal elements of the covariance matrix simulates an isotropically distributed signal in the received signals at a power level that is proportional to some function of the regularization constant. If beta is chosen to be larger than those terms appearing in the covariance matrix that are due to interference or noise sources, it can mask the effects of those sources in the development of a beam-forming strategy, thereby reducing the sensitivity of the antenna array or beam-forming strategy to them.

With regularization or diagonal loading, the receive weight vector overtraining problem can be minimized by substituting the diagonally loaded covariance matrix of Eq. (7) for the unloaded covariance matrix appearing in Eq. (6). This allows the receive processors 217 to determine receive weight vectors that are insensitive to the spurious and non-isotropically distributed sources of noise and interference that are present in the limited receive signal samples that are used to form the unloaded covariance matrix. The noise and interference insensitive receive weight vectors can be written:

$$\vec{w}_r = (\vec{z} \cdot \vec{z}^H + \beta \cdot I)^{-1} \cdot (\vec{z} \cdot \vec{s}^H). \tag{8}$$

where $\vec{s}^H$ is the Hermitian conjugate of the locally generated reference signal, and the covariance matrix is made by sampling the received signals at those times during a communications burst when the remote transceiver is known to be transmitting a known signal.

Figure 3:
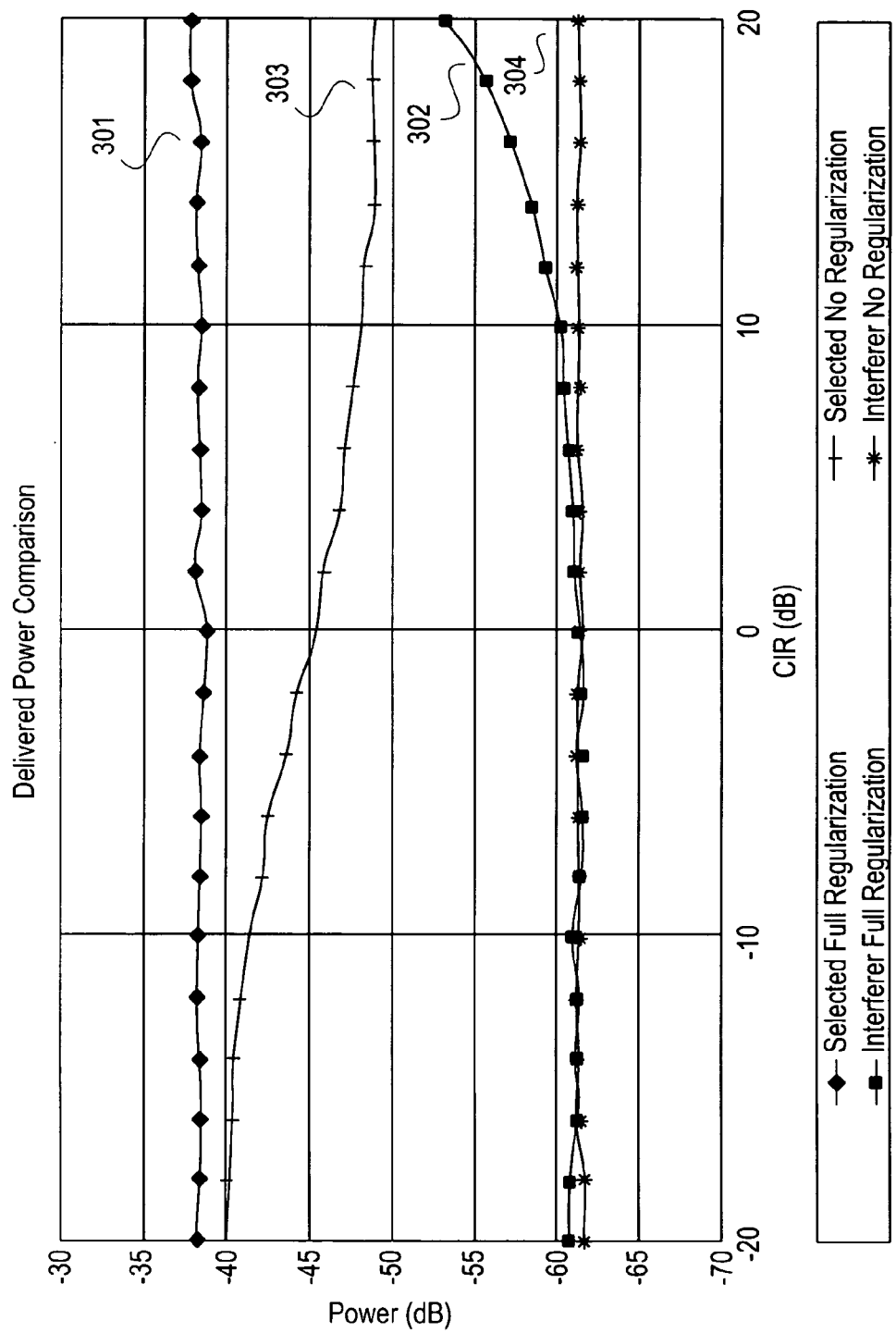
FIG. 3 is a plot of the power delivered to a selected transceiver and to an interferer with and without regularization as a function of the carrier-to-interference ratio.

The effects of diagonally loading the covariance matrix can be seen in reference to FIG. 3, which shows the power in dB delivered to a selected transceiver (curves 301 and 303) and an interfering transceiver (curves 302 and 304) as a function of both the carrier-to-interference ratio ("CIR") and the use of a regularization constant. The curves in FIG. 3 were generated by developing beam-forming strategies for communications to a selected transceiver based upon signals received from simulated selected and interfering transceivers. The signals from the simulated selected and interfering transceivers were hardwired to the antennas of antenna array 103 through fading generators that simulated the effects of both motion and multipath interference of the transceivers. At the 0 dB CIR level, both the selected and interfering transceiver signals were set to 40 dB above the ambient noise level. To the right of the 0 dB level, the CIR was increased by maintaining the selected transceiver signal at 40 dB above the noise level, while reducing the strength of the interfering transceiver signal. To the left of the 0 dB level, the CIR was decreased by maintaining the interfering transceiver signal at 40 dB above the noise level, while reducing the strength of the selected transceiver signal.

The various curves (301-304) shown in FIG. 3 provide useful insight into the effects regularization or diagonal loading has on the development of beam-forming strategies in an adaptive smart antenna processing system. Curves 301 and 303 respectively show the power delivered to the selected transceiver as a function of the CIR when beamforming strategies are developed from a covariance matrix to which regularization constants have and have not been added. Similarly, curves 302 and 304 respectively show the power delivered to the interfering transceiver as a function of the CIR when beam-forming strategies are developed from a covariance matrix to which regularization constants have and have not been added.

Two observations about the effects of regularization on the development of beam-forming strategies can immediately be made from the curves shown in FIG. 3. First, the absolute power delivered to the selected transceiver is both larger and flatter over a wider CIR range when a regularization constant is added to the covariance matrix (curve 301), then when a regularization constant is not added (curve 303). Second, the absolute null delivered to the interfering transceiver is both deeper and flatter over a wider CIR range when no regularization constant is added to the covariance matrix (curve 304), then when a regularization constant is added (curve 302).

These effects can be explained as follows. When a regularization constant is added to the covariance matrix, it simulates a randomly distributed noise spectrum in the received signal that masks the contributions of any noise or interference sources at power levels that are below the power level represented by the regularization constant. As a result, simple beam-forming strategies can be developed throughout the entire CIR range to null only large interferers, or those interferers that are injecting power into the received signals at power levels that are greater than the power level represented by the regularization constant. As seen in curve 302, these simple beam-forming strategies deliver a strong and broad null to the interfering transceiver below a CIR of 10 dB where the interfering transceiver's power is greater than the power level represented by the added regularization constant. They also deliver progressively weaker nulls to the interfering transceiver above a CIR of 10 dB as the interfering transceiver's power approaches and eventually drops below the power level represented by the regularization constant. Above 10 dB, the interfering transceiver is very weak and the beam-forming strategies that are developed pay little attention to its presence or absence. Since the beam-forming strategies developed with regularization null at most a few large interfering transceivers, such beam-forming strategies are able to deliver a uniformly large amount of power to the selected transceiver over the entire CIR range as can be seen in curve 301.

When no regularization constant is added to the covariance matrix, the beam-forming strategy is a function of the strength of the interfering transceiver. When the interfering transceiver is strong, e.g. at negative values of the CIR, a simple beamforming strategy can be developed that directs only one significant null in the direction of the interfering transceiver. As shown in curve 303, this beam-forming strategy is able to effectively deliver power to the selected transceiver. However, when the interfering transceiver is weak, e.g. at positive values of the CIR, complex beam-forming strategies can be developed to null not only the weak interfering transceiver but spurious noise sources that inject power into the received signals at levels approaching those of the interfering transceiver. These complex beam-forming strategies cannot effectively deliver power to the selected transceiver, as can be seen in curve 303, which shows how the power delivered to the selected transceiver dramatically falls off as the CIR increases and the power level of the interfering transceiver approaches the noise level.

Observation of the different ways regularization affects the power delivered to or received from a selected transceiver and an interfering transceiver suggests that the performance of an adaptive smart antenna processing system can be enhanced by selecting different regularization constants for different smart adaptive antenna processing systems communicating with different remote transmitters, receivers, or transceivers under different operating conditions. In particular, the performance of smart adaptive antenna processing systems can be enhanced by selecting different regularization constants in the development of both uplink and downlink processing strategies based on one or more of the following factors: the quality of the reference signal used to determine the receive or transmit weight vectors; the amount of intersymbol interference in a given communications channel; the number of training symbols used to determine the receive or transmit weight vectors; the pathloss to a selected transceiver; and whether spatial processing is being used to define spatial channels in a spatial division multiple access system.

The quality of the reference signal is a measure of the discrepancy between a received waveform and a reference waveform, excluding discrepancies that are attributable to noise and interference. The quality of the reference signal can be affected by the quality of the circuits or algorithms used by the smart adaptive antenna processing system to generate the reference waveform or by the quality of the circuits or algorithms used by a device to generate and transmit the received waveform that is processed by the smart adaptive antenna processing system. In a preferred embodiment of the invention, a smart adaptive antenna processing system receives a plurality of waveforms from a respective plurality of devices, corresponding to a respective plurality of reference signal qualities. In this embodiment, the plurality of reference signal qualities is due, in part, to distortions introduced into the transmitted waveforms by the respective plurality of devices communicating with the smart adaptive antenna processing system.

In general, as the quality of the reference signal decreases, the size of the error signal or difference between the reference signal and the weighted received signal will increase. This artificially increases the number of "interferers" the smart adaptive antenna processing system has to consider in developing a beamforming strategy, thereby artificially decreasing the system's ability to deliver power to the selected transceiver. To increase the performance of the smart adaptive antenna processing system, its sensitivity to the artificial or ghost interferers that are created by the poor quality of the reference signal can be reduced by adding isotropically distributed noise or synthetic signals to the received signal at power levels that are greater than the level of the reference signal error. This can be done, e.g., by adding a regularization constant to the covariance matrix made from samples of the received signal. The size of the regularization constant can be increased as the size of the reference signal error increases or as the quality of the reference signal decreases. Changes in the quality of the reference signal can be due to such effects as time or frequency offsets, phase variance, and distortion in the circuits and algorithms used to generate and compare the reference signal and the transmitted signal.

The amount of isotropically distributed noise or synthetic signal added to the received signal can also be made dependent upon the level of intersymbol interference encountered while determining an uplink or downlink beamforming strategy. The intersymbol interference can be defined as the disturbance caused by extraneous energy from the signal in one or more keying intervals that interferes with the reception of the signal in another keying interval. As the level of intersymbol interference increases, the error signal between the reference signal and the weighted received signal increases, inhibiting the ability of the adaptive antenna processing system to accurately determine receive or transmit weight vectors and develop an efficient beamforming strategy. As before, the performance of the smart adaptive antenna processing system can be improved by decreasing its sensitivity to artificial or ghost interferers created by the amount of intersymbol interference. The sensitivity of the smart antenna processing system can be reduced by adding isotropically distributed noise or synthetic signals to the received signal at power levels that are greater than intersymbol interference level. This can be done in any of a number of ways, including but not limited to adding a regularization constant to the covariance matrix made from samples of the received signal, injecting noise or synthetic signals into the antenna elements, or manipulating the eigenvalues of the received signal covariance matrix. In one implementation, the sensitivity of the smart antenna processing system is decreased by increasing the level of the isotropically distributed noise or synthetic signals that are added to the received signal as the level of intersymbol interference increases.

The amount of isotropically distributed noise or synthetic signal added to the received signal can also be made dependent upon the amount data, including training data, which is used to develop an uplink or downlink beamforming strategy. In general, as more data is used to determine a beamforming strategy, the statistical estimates of not only the transmitted signal, but of the noise and interference environment determined by the smart adaptive antenna processing system will improve. Consequently, the sensitivity of the smart antenna processing system to ghosts or spurious sources of interference that result from statistical uncertainties in the determination of the receive or transmit weight vectors will decrease. As a result, the size of the regularization constant added to the received signal covariance matrix or of the noise or synthetic signals added to the received signals can be reduced as the amount of data used to determine an uplink or downlink beamforming strategy is increased.

The amount of data, including training data, that is used to develop a beamforming strategy can depend on any of a number of factors including, but not limited to, the type of communications protocol used, the characteristics or type of the smart antenna processing system, the characteristics or type of the selected transceiver with which the processing system is communicating, and the type of data burst from which the beamforming strategy is developed. For example, if a particular data burst from which a beamforming strategy is developed does not require an immediate response from the smart adaptive antenna processing system, the system can spend more time and consider more data, including training data, when developing a beamforming strategy. Similarly, a smart adaptive antenna processing system that is running particularly efficient beamforming algorithms or that is not limited by processing power or memory limitations will generally be able to process more data, including training data, when developing beamforming strategies than will other systems. In either case, because it considers more data in the development of its beamforming strategy, the smart adaptive antenna processing system will develop better estimates of the transmitted signal and the interference and noise environment, and will be less sensitive to the spurious sources of interference. Consequently, the amount of regularization or the level of noise or synthetic signal that needs to be injected into the smart adaptive antenna processing system to desensitize it to spurious sources of noise can be decreased.

The amount of isotropically distributed noise or synthetic signal added to the received signal can also be made dependent upon the pathloss to a selected transceiver. The pathloss can be measured by the smart antenna processing system from the quality of the received signal, or it can be measured by the selected remote transceiver and fed back to the smart antenna. The greater the pathloss to a selected transceiver, the more regularization is needed to reduce the sensitivity of the smart antenna processing system to spurious sources of noise and interference and increase the communications ability of the system with the selected transceiver.

The amount of isotropically distributed noise or synthetic signal added to the received signal can also be made dependent upon whether the smart antenna processing system communicating with two or more transceivers on two or more spatial channels in a spatial division multiple access system. When a selected transceiver and interfering transceiver are using the same time or frequency channel in a spatial division multiple access system, it is important that adequate nulls be delivered to all other transceivers when the smart antenna processing system is communicating with a selected transceiver. In general, the nulling power of the smart antenna processing system decreases as the level of isotropically distributed noise or synthetic signals added to the received signals increases. Consequently, when an interfering and selected transceiver are communicating with a smart antenna processing system on two SDMA channels, the amount of regularization or isotropically distributed noise or synthetic signals should be reduced to increase the sensitivity of the array to the signals received from the interfering transceiver.

Figure 4:
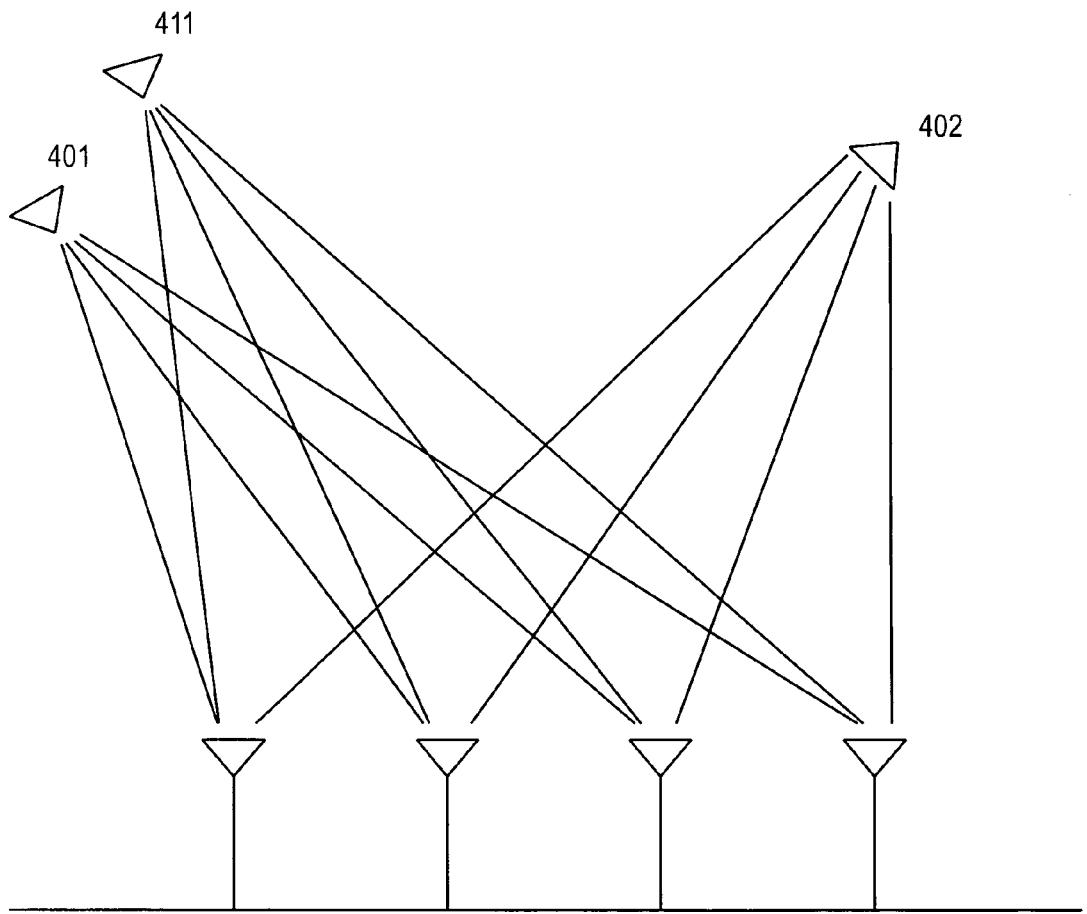
FIG. 4 is a schematic illustration of a communication between a base station transceiver and a selected transceiver in which the base station transceiver receives both co-linear ghost interference from the selected transceiver and interference from a third transceiver.

Aspects of these and other implementations of the invention can be described below in reference to FIG. 4. As shown in FIG. 4, while communicating with a selected transceiver 401 an adaptive smart antenna processing system may receive signals not only from the selected transceiver 401, but signals from a ghost transceiver 411, and from an interfering transceiver 402. The signals from ghost transceiver 411 can be generated in a number of ways, including but not limited to: reflection of the signals transmitted by the selected transceiver 401 off of one or more large conducting objects such as buildings before being received by the adaptive antenna processing system; timing or frequency offsets between the signal generated by the selected transceiver 401 and the locally generated reference signal; distortion in the amplifiers used to generate the signals transmitted by the selected transceiver 401 or in the amplifiers that are used to boost the signals received from the selected transceiver 401. In many cases, as shown in FIG. 4, the signals received from ghost transceiver 411 will be spatially aligned with the signals received from selected transceiver 401. By contrast, in many cases the signals received from interfering transceiver 402 will not be spatially aligned with the signals received from selected transceiver 401.

When the signals received by the smart adaptive antenna processing system from selected transceiver 401 are strong, e.g., when there is little pathloss to the selected transceiver, an uplink processing strategy can be developed to strongly reject the signals received from both ghost transceiver 411 and interfering transceiver 402 since the smart adaptive processing system can afford to lose some of the uplink signal from the selected transceiver 401. The signals received from ghost transceiver 411 and interfering transceiver 402 can be strongly rejected by the adaptive smart antenna processing system on the uplink by adding at most a nominal amount of simulated noise or synthetic signals to the received signals, e.g., by adding at most a small regularization constant to the covariance matrix that is used to determine the receive weight vector for selected transceiver 401. When a nominally small regularization constant is added to the covariance matrix, the adaptive smart antenna processing system remains sensitive to both the signals from ghost transceiver 411 and interfering transceiver 402, and develops an uplink processing strategy and receive weight vector that strongly rejects signals from both.

Interestingly, while it is desirable that the adaptive smart antenna processing system strongly reject signals from both ghost 411 and interfering transceiver 402 on the uplink, it is also desirable that the system null only interfering transceiver 402 and not ghost transceiver 411 on the downlink. The reason, of course, is that ghost transceiver 411 does not correspond to a physical transceiver that can be interfered with by a downlink transmission from the smart antenna processing system to selected transceiver 401. Since there is no danger of interfering with ghost transceiver 411, there is no reason to null ghost transceiver 411, especially since nulling ghost transceiver 411 would reduce the strength of the signal that can be transmitted to selected transceiver 401. A downlink processing strategy can be developed that ignores ghost transceiver 411 by adding synthetic noise or a synthetic signal to the signals received from selected transceiver 401. The synthetic noise or signal can be added to the received signals by adding a regularization constant to the covariance matrix made from the received signals that is representative of a power level that is greater than the power level of the signals received by ghost transceiver 411. However, the synthetic noise or signal cannot be added to the received signals at power levels that are larger than the level of the signals received from interfering transceiver 402, especially when interfering transceiver 402 needs to be nulled for any reasons. For example, if interfering transceiver 402 is a co-time or frequency channel user with selected transceiver 402 in an SDMA system, an adequate null needs to be delivered to it to maintain the integrity of the spatial channel.

When the signals received by the smart adaptive antenna processing system from selected transceiver 401 are weak, i.e., when there is a large pathloss to selected transceiver 401, different factors are considered in determining whether isotropically distributed synthetic signals or noise should be added to the received signals in the formation of uplink and downlink processing strategies. When the received signals from selected transceiver 401 are weak, the adaptive smart antenna processing system cannot afford to lose much signal when developing an uplink processing strategy. Consequently, the adaptive smart antenna processing system cannot afford to strongly reject the signals from either ghost transceiver 411 or interfering receiver 402. The smart adaptive antenna processing system can develop an uplink processing strategy that does not strongly reject signals from either ghost transceiver 411 or interfering transceiver 402 by adding isotropically distributed noise or synthetic signals to the received signals at power levels that are greater than the power level of the signals received from either transceiver. The synthetic noise or signals can be added to the received signals, e.g., by adding a regularization constant to the covariance matrix that is used to determine the receive weight vector for the selected transceiver 401. When such a regularization constant is added to the covariance matrix, the adaptive smart antenna processing system becomes insensitive to the signals from both ghost transceiver 411 and interfering transceiver 402, and develops an uplink strategy and receive weight vector that ignores the presence of signals from both. However, the noise or synthetic signals cannot be added to the received signals at levels that are larger than the level of the signals received from interfering transceiver 402 whenever interfering transceiver 402 needs to be nulled for any reason, e.g., because it is a co-time or frequency channel user with selected transceiver 402 in an SDMA system.

Finally, when the signals received from the selected transceiver 401 are weak, it is desirable to develop a downlink processing strategy that delivers the strongest possible signal to selected transceiver 401. This can be achieved by delivering weak nulls to both ghost transceiver 411 and interfering transceiver 402. A downlink processing strategy that delivers such weak nulls can be developed by adding isotropically distributed synthetic signals or noise to the received signals at power levels that are larger than those of the signals received from ghost transceiver 411 and interfering transceiver 402. The synthetic signals or noise can be added to the received signals by adding a regularization constant to the received signal covariance matrix that is representative of the power level needed to mask interfering transceiver 402 and ghost transceiver 411. This regularization constant will render the smart adaptive antenna processing system insensitive to signals received from either ghost 411 or interfering transceiver 402, and will result in the development of a beam-forming strategy that delivers weak nulls to both ghost 411 and interfering transceiver 402. However, the synthetic noise or signal cannot be added to the received signals at levels that are larger than the level of the signals received from interfering transceiver 402 whenever interfering transceiver 402 needs to be nulled on the downlink for any reason, e.g., because it is a co-time or frequency channel user with selected transceiver 402 in an SDMA system.

In reference to FIG. 4, improvements in the development of uplink and downlink processing strategies as a function of the strength of the signals received from or transmitted to a selected transceiver were discussed. The improvements were made by adding isotropically distributed synthetic signals or noise to the signals received by the smart adaptive antenna processing system, e.g., by adding an appropriately sized regularization constant to the received signal covariance matrix used to develop the receive (uplink) and transmit (downlink) weight vectors. In general the amount of synthetic noise or synthetic signal added to the received signals can be different depending on whether a receive weight vector for an uplink processing strategy is being developed, or a transmit weight vector for a downlink processing strategy is being developed.

The improvements in the development of uplink and downlink processing strategies for communications between a selected transceiver and an adaptive smart antenna processing system can be made as a function of one or more qualities of the signals received from the selected transceiver and one or more interfering transceivers. These include, but are not limited to, the quality of the reference signal, the number of training symbols used to develop the processing strategy, the amount of pathloss, the power delivered to or received from the selected transceiver; the signal-to-noise (SNR) ratio, carrier-to-interference ratio (CIR), frame error rate (FER) or bit error rate (BER) of the signals received from the selected transceiver; the relative importance of communications to or from the selected transceiver and one or more of the interfering transceivers; the need to reject signals received from one or more of the interfering transceivers; the need to mitigate or null one or more of the interfering transceivers when transmitting to the selected transceiver; and the spatial correlation between the selected transceiver and one or more of the interfering transceivers. Each quality can be measured in the smart antenna processing system itself, can be measured in the selected transceiver and communicated to the smart antenna processing system, or can be stored in a database that characterizes the nature of the selected and interfering transceivers and the signals received from each of them.

The invention can be implemented in electronic circuitry, or in computer hardware, software, firmware, or any combination thereof. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output data. The invention can be implemented advantageously in one or more computer programs that are executable on a programmable system including at least one programmable processor coupled to receive data and instructions from at least one input device, and to transmit data and instructions to at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors including digital signal processors and application specific integrated circuits (ASICs). Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks.

A number of implementations of the invention have been described. Nevertheless, it will be understood that various modifications may be made without departing from the spirit and scope of the invention. Accordingly, other implementations are within the scope of the following claims.

What is claimed is:

1. A method, comprising:
    taking a number of discrete samples of a received signal in an adaptive antenna array processing system;
    estimating a noise environment of the received signal from the discrete samples;
    applying a regularization constant to a covariance matrix of the received signal to regularize the estimated noise environment;
    adding a variable synthetic signal based on the regularized estimated noise environment to the received signal to reduce a noise contribution for noise at power levels below the regularization constant; and
    developing a spatial processing strategy based on the regularized noise environment.

2. The method of claim 1, wherein taking the number of discrete samples further comprises:
    determining a quality of a reference signal used by the adaptive antenna array processing system; and
    wherein adding the variable synthetic signal comprises:
    increasing the variable to include a greater signal level of the variable synthetic signal as the quality of the reference signal decreases.

3. The method of claim 1, wherein estimating the noise environment of the signal from the discrete samples comprises:
    determining an amount of intersymbol interference in signals processed by the adaptive antenna array processing system; and
    wherein adding the variable synthetic signal comprises:
    increasing the variable to include a greater signal level of the variable synthetic signal as the intersymbol interference increases.

4. The method of claim 1, wherein estimating the noise environment of the signal from the discrete samples comprises:
    generating a covariance matrix to use to develop the signal processing strategy; and
    wherein adding the variable synthetic signal comprises:
    adjusting diagonal elements of the covariance matrix to result in a regularized noise environment.

5. The method of claim 1, wherein adding the variable synthetic signal comprises:
    adding a signal having an isotropically distributed component.

6. The method of claim 1, wherein developing the spatial processing strategy comprises:
    adding the variable synthetic signal at the signal level to diagonal elements of a covariance matrix made from a signal received from a device communicating with the adaptive antenna processing system.

7. The method of claim 1, wherein developing the spatial processing strategy comprises:
    adding the variable synthetic signal at the signal level to each element of the adaptive antenna array processing system.

8. The method of claim 1, wherein developing the spatial processing strategy comprises:
    separately determining a signal level of the variable synthetic signal to add to the uplink and a signal level of the variable synthetic signal to add to the downlink;
    developing an uplink processing strategy based at least in part on the signal level determined for the uplink; and developing a downlink processing strategy based at least in part on the signal level determined for the downlink.

9. The method of claim 1, wherein the adaptive antenna array processing system is disposed within a handset, and wherein taking the number of discrete samples of the received signal comprises taking a number of discrete samples of a signal received from a base station.

10. An article of manufacture comprising a machine readable medium having instructions to cause a programmable processor to perform operations, including:
   taking a number of discrete samples of a received signal in an adaptive antenna array processing system;
   estimating a noise environment of the received signal from the discrete samples;
   applying a regularization constant to a covariance matrix of the received signal to regularize the estimated noise environment,
   adding a variable synthetic signal based on the regularized estimated noise environment to the received signal to reduce a noise contribution for noise at power levels below the regularization constant; and
   developing a spatial processing strategy based on the regularized noise environment.

11. The article of manufacture of claim 10, wherein the instructions for estimating the noise environment of the signal from the discrete samples comprise instructions for:
   determining an amount of intersymbol interference in signals processed by the adaptive antenna array processing system; and
   wherein the instructions for adding the variable synthetic signal comprise instructions for:
   increasing the variable to include a greater signal level of the variable synthetic signal as the intersymbol interference increases.

12. The article of manufacture of claim 10, wherein the instructions for adding the variable synthetic signal comprise instructions for:
   adding a signal having an isotropically distributed component.

13. The article of manufacture of claim 10, wherein the instructions for developing the spatial processing strategy comprise instructions for:
   separately determining a signal level of the variable synthetic signal to add to the uplink and a signal level of the variable synthetic signal to add to the downlink;
   developing an uplink processing strategy based at least in part on the signal level determined for the uplink; and
   developing a downlink processing strategy based at least in part on the signal level determined for the downlink.

14. An apparatus for developing a spatial processing strategy in an adaptive antenna array processing system, comprising:
   means for taking a number of discrete samples of a received signal in an adaptive antenna array processing system;
   means for estimating a noise environment of the received signal from the discrete samples;
   means for applying a regularization constant to a covariance matrix of the received signal to regularize the estimated noise environment;
   means for adding a variable synthetic signal based on the regularized estimated noise environment to the received signal to reduce a noise contribution for noise at power levels below the regularization constant; and
   means for developing a spatial processing strategy based on the regularized noise environment.

15. The apparatus of claim 14, the means for taking the number of discrete samples further comprising:
   means for determining a quality of a reference signal used by the adaptive antenna array processing system; and
   the means for adding the variable synthetic signal comprising:
   means for increasing the variable to include a greater signal level of the variable synthetic signal as the quality of the reference signal decreases.

16. The apparatus of claim 14, the means for estimating the noise environment of the signal from the discrete samples comprising:
   means for generating a covariance matrix to use to develop the signal processing strategy; and
   the means for adding the variable synthetic signal comprising:
   means for adjusting diagonal elements of the covariance matrix to result in a regularized noise environment.

17. The apparatus of claim 14, wherein the apparatus comprises a subscriber unit.

18. A handset comprising:
   a transmitter operative to send an uplink signal to a transceiver, the uplink signal to cause the transceiver to take a discrete number of samples of the uplink signal, estimate a noise environment of the uplink signal from the discrete samples, apply a regularization constant to a covariance matrix of the uplink signal to regularize the estimated noise environment, add a variable synthetic signal based on the regularized estimated noise environment to the uplink signal to reduce a noise contribution for noise at power levels below the regularization constant, develop a downlink processing strategy based on the regularized noise environment, and transmit a downlink signal in accordance with the downlink processing strategy, the downlink signal having an improved signal quality over the uplink signal; and
   a receiver operative to receive and process the downlink signal having the improved signal quality.

19. The handset of claim 18, the transmitter operative to send the uplink signal to the transceiver comprising:
   the transmitter operative to send an uplink signal having training data, the training data to cause the transceiver to add a variable level of the synthetic signal to the uplink signal, the variable level of the synthetic signal based, at least in part, on an amount of training data in the uplink signal.

20. The handset of claim 18, the transmitter operative to send the uplink signal to the transceiver comprising:
   the transmitter operative to send the uplink signal on a shared signal channel on which the handset is a co-channel transceiver with another transceiver, the uplink signal on the shared channel to cause the transceiver to add a variable level of the synthetic signal to the uplink signal, the variable level of the synthetic signal be less than a power level of an uplink signal of the co-channel transceiver.

21. A method comprising:
   sending an uplink signal from a subscriber unit to a transceiver, the uplink signal to cause the transceiver to take a discrete number of samples of the uplink signal, estimate a noise environment of the uplink signal from the discrete samples, apply a regularization constant to a covariance matrix of the uplink signal to regularize the estimated noise environment, add a variable synthetic signal based on the regularized estimated noise environment to the uplink signal to reduce a noise contribution for noise at power levels below the regularization constant, develop a downlink processing strategy with the regularized noise environment, and transmit a downlink signal in accordance based on the downlink processing strategy, the downlink signal having an improved signal quality over the uplink signal; and receiving the downlink signal having the improved signal quality.

22. A method comprising:

sending an uplink signal from a subscriber unit to a transceiver; and receiving, at the subscriber unit, a downlink signal from the transceiver produced with a downlink processing strategy, the downlink processing strategy to include estimating a noise environment of the uplink signal from a discrete number of samples of the uplink signal, applying a regularization constant to a covariance matrix of the uplink signal to regularize the estimated noise environment, adding a variable synthetic signal based on the regularized estimated noise environment to the uplink signal to reduce a noise contribution for noise at power levels below the regularization constant.

* * * * *

UNITED STATES PATENT AND TRADEMARK OFFICE
CERTIFICATE OF CORRECTION

PATENT NO. : 7,593,693 B1  
APPLICATION NO. : 11/375500  
DATED : September 22, 2009  
INVENTOR(S) : Kasapi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Fourteenth Day of December, 2010

David J. Kappos  
*Director of the United States Patent and Trademark Office*